US008973843B2

(12) United States Patent
Simske et al.

(10) Patent No.: US 8,973,843 B2
(45) Date of Patent: Mar. 10, 2015

(54) SYSTEM FOR GENERATING AN INCREMENTALLY COMPLETED SECURITY MARK

(75) Inventors: Steven J. Simske, Fort Collins, CO (US); Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 13/810,722

(22) PCT Filed: Oct. 12, 2010

(86) PCT No.: PCT/US2010/052406
§ 371 (c)(1),
(2), (4) Date: Jan. 17, 2013

(87) PCT Pub. No.: WO2012/050569
PCT Pub. Date: Apr. 19, 2012

(65) Prior Publication Data
US 2013/0193218 A1    Aug. 1, 2013

(51) Int. Cl.
*G06K 19/06* (2006.01)
*H04N 1/32* (2006.01)
*G06T 1/00* (2006.01)

(52) U.S. Cl.
CPC ...... *G06K 19/06037* (2013.01); *H04N 1/32293* (2013.01); *H04N 1/32325* (2013.01); *G06T1/0071* (2013.01); *H04N 2201/3269* (2013.01); *H04N 2201/3271* (2013.01); *G06T 2201/0051* (2013.01); *G06T 2201/0064* (2013.01)
USPC .......................................................... 235/494

(58) Field of Classification Search
USPC .......................................... 235/435, 492, 494
See application file for complete search history.

(56) References Cited

U.S. PATENT DOCUMENTS

| 7,225,991 B2 | 6/2007 | Jones et al. |
| 7,229,025 B2 | 6/2007 | Sussmeier et al. |

(Continued)

FOREIGN PATENT DOCUMENTS

WO    PCT-2009/139631    11/2009

OTHER PUBLICATIONS

Simske, S. J. et al. Document imaging Security and Forensics Ecosystem Considerations. In: DocEng '10 Proceedings of the 10th ACM Symposium on Document Engineering, Manchester, UK, Sep. 2010, pp. 41-50, See the whole document.

*Primary Examiner* — Daniel Hess
(74) *Attorney, Agent, or Firm* — Dierker & Associates; Julia Dierker

(57) ABSTRACT

A system (10) for generating an incrementally completed security mark (20''') includes a computer-readable medium encoded with a computer program. The computer program includes computer readable code for selecting a carrier object (20, 20', 20'', 20'''); computer readable code for selecting a number of steps in a workflow associated with the carrier object (20, 20', 20'', 20''') and a security level for each step in the workflow; computer readable code for determining available carrier object candidate areas ($T_1$, $T_2$, $T_3$, $T_4$, $T_5$) to which to write information at each step in the workflow; and computer readable code for determining a number of bits to be input at each step in the workflow based upon the respective security levels and the available candidate areas ($T_1$, $T_2$, $T_3$, $T_4$, $T_5$). The system further includes memory and a processor operatively coupled to the memory and to the computer-readable medium.

15 Claims, 3 Drawing Sheets

(56) References Cited

U.S. PATENT DOCUMENTS

| | | |
|---|---|---|
| 7,567,941 B2 | 7/2009 | Sagi et al. |
| 2007/0177824 A1 | 8/2007 | Cattrone et al. |
| 2009/0166418 A1* | 7/2009 | Onoda et al. ............ 235/435 |
| 2010/0004939 A1 | 1/2010 | Ferraro et al. |
| 2010/0072269 A1 | 3/2010 | Scott et al. |

* cited by examiner

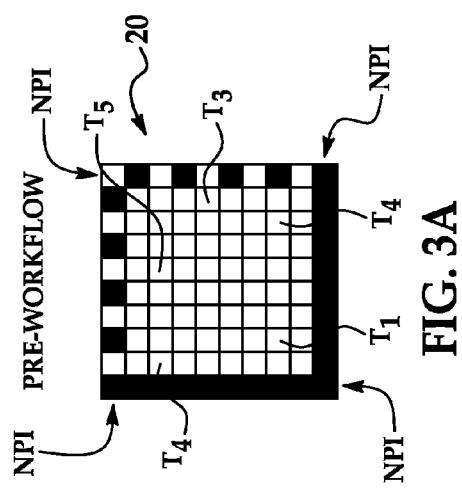
FIG. 3A
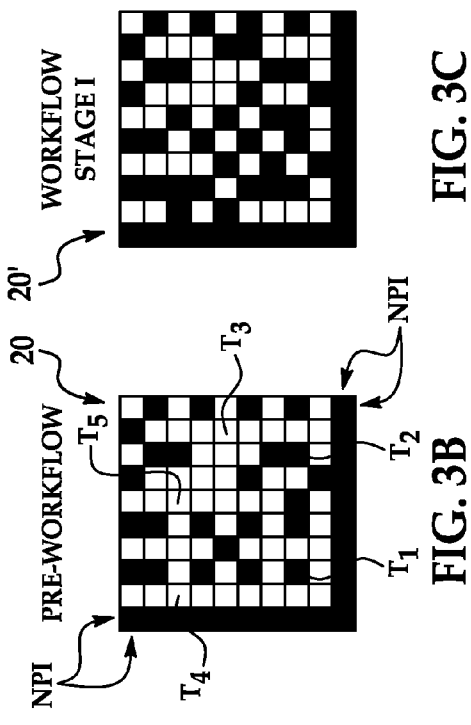
FIG. 3B
FIG. 3C
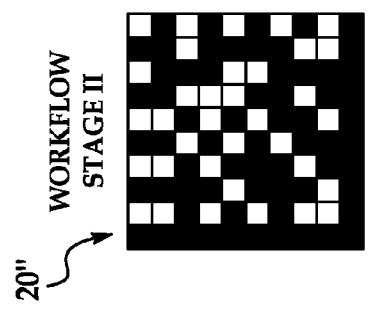
FIG. 3D
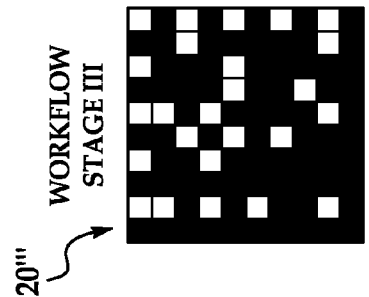
FIG. 3E
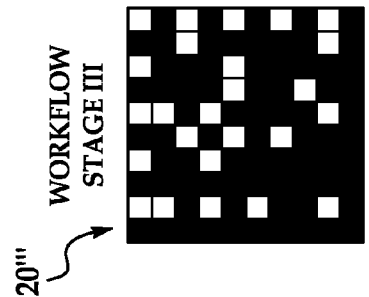

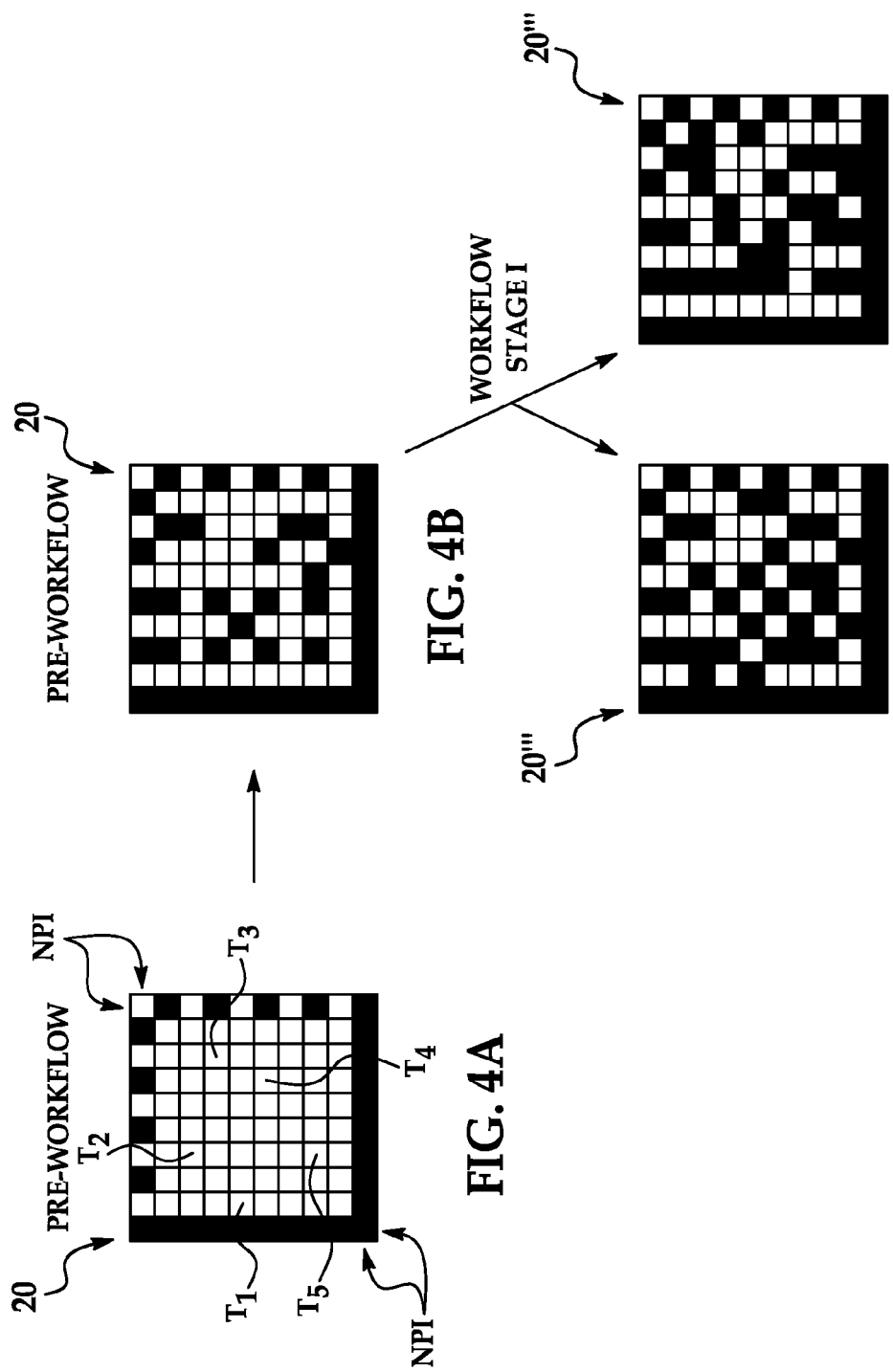

US 8,973,843 B2

SYSTEM FOR GENERATING AN INCREMENTALLY COMPLETED SECURITY MARK

BACKGROUND

The present disclosure relates generally to a system for generating an incrementally completed security mark.

Documents exist in both physical (e.g., printed) and electronic forms. During its lifecycle (i.e., the document in all its forms from creation to completion), one document may move between physical and electronic forms several times and may also progress through several stages of a workflow (i.e., a defined set of stages, usually with task(s) at each stage, which a document must pass through during its lifecycle, to perform some useful purpose). Security features laden with information (e.g., bar codes) may be associated with the document, and may be used to move the document from one stage to the next in its workflow. As one example, sequential security features (e.g., sequential barcodes) may be added to the document at each stage in the workflow. This approach may be useful because each stage of the workflow can be associated with one of the sequential barcodes, and thus the status of the workflow can be monitored via the barcodes that have been added. As another example, a single static security feature (e.g., one barcode) may be used throughout the workflow to identify the item. This approach is sensitive to the use of "real estate" (layout area) on the physical form of the document, but does not enable one to monitor the status of the workflow via the security feature.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A through 3E depict an embodiment of a carrier object as it progresses through a workflow and has information incrementally written thereto to generate an embodiment of an identifying object; and FIGS. 4A through 4D depict another embodiment of a carrier object as it progresses through a workflow, where FIGS. 4C and 4D illustrate two examples of how the carrier object can have information incrementally written thereto during a single stage of a workflow.

DETAILED DESCRIPTION

Embodiments of the system disclosed herein are used to generate an identifying object (e.g., a feature or mark laden with information). In an embodiment, the information-carrying identifying object does not grow in size and/or shape as the item moves through a workflow associated therewith, even though information may be added at each stage of the workflow. The identifying object may be designed taking into account security needs, the type of readers available, and other concerns (e.g., branding, fraud prevention, robustness to damage, etc.).

As previously mentioned, a workflow is a defined set of stages, usually with task(s) at each stage, which a document must pass through during its lifecycle. In one embodiment, the workflow is an automated process during which documents, information, and/or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics (e.g., inventory, average time at a node, etc.), compliance, auditing, etc.). In other words, a workflow is any defined set of tasks to complete associated with a document. Also as used herein, a "node" refers to a then-current stage in the workflow. In one embodiment, if a document moves from a creator to an editor to a subscriber, the respective nodes are, for example, creation, editing, and receiving. At any instance, the node corresponds with a current version (whether physical or electronic) of a document (e.g., a composite document, or a document including several items (e.g., PDFs, PPTs, DOCs, etc.)). It is to be understood that nodes can also be in parallel, for example, when multiple recipients need to acknowledge receipt.

The document and its associated identifying object may be physical (e.g., print over the same sheet at each stage in the workflow), electronic (e.g., information added electronically), and/or mixed physical and electronic (e.g., printed and scanned, information added electronically, and then re-printed).

Figure 1:
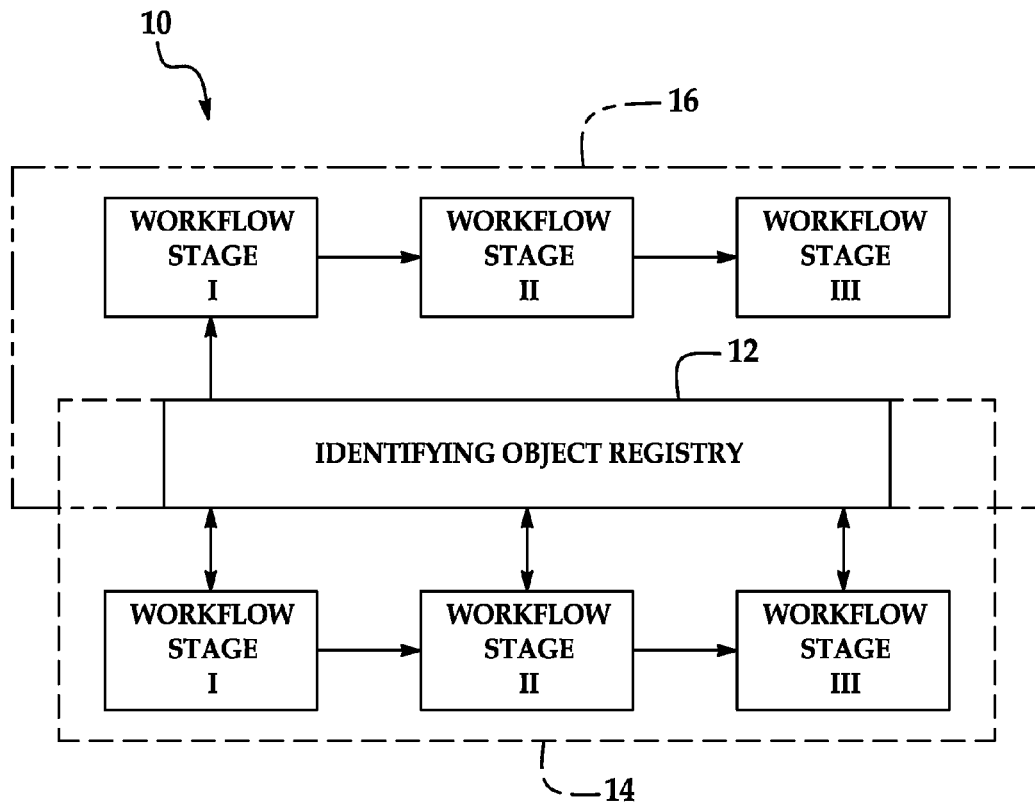
FIG. 1 is a schematic diagram of two embodiments of a system for generating an incrementally completed security mark.

Referring now to FIG. 1, an embodiment of the system 10 for generating embodiments of the identifying object is depicted. As shown in FIG. 1, the system 10 may be set up to perform a registry-based workflow 14 or an independent incremental workflow 16. Each of these workflows 14, 16 involves a different path by which the document and identifying object are received at the various stages. When a registry-based workflow 14 is utilized, at each stage in the workflow, a user receives the document and its associated identifying object from the previous user, but the user can refer back to the registry 12 for information about the document and its associated identifying object. The addition to the identifying object at each stage in the workflow will be performed in conjunction with the registry 12. When an independent incremental workflow 16 is utilized, there is no backward visibility in the workflow stage-stage transmission, and the user receives the document and an intelligent hash of the previous state of the identifying object from the previous user. In this embodiment, the users at the various workflow stages may/do not have access to the registry 12 (i.e., the identifying object is updated independently of the registry 12), and the addition to the identifying object at each stage in the workflow will be performed in conjunction with initial instructions received from the registry 12. Each stage of the workflow can be deduced when the starting point is known, as most workflows have a small and well-defined set of nodes. This embodiment may be desirable, for example, when the distribution network organization is proprietary.

The system 10 includes the identifying object registry 12 that includes hardware (e.g., memory, processor, etc.) and/or software (computer program(s) with computer readable code) for generating an incrementally completed security mark. Access to the registry 12 may be secure (e.g., requiring a login and password or other authorization method, such as biometric validation of identity, possession of a secure token, etc.) or unsecure (e.g., publicly accessible).

In one embodiment (e.g., when the registry-based workflow 14 is used), the system 10 may be set up as a cloud computing network, which is a virtualized bank of computers (e.g., processors and/or servers) that enables Internet-based computing. Via the cloud network, shared resources, software and information are provided to various computing devices (i.e., those operating at the various workflow stages, whether stationary (e.g., desktop computers) or mobile (e.g., laptop computers, netbooks, cellular phones, personal digital assistants (PDAs), etc.)) on-demand. The cloud computing network allows the registry system provider (not shown) to deliver the identifying object registry 12 and its various services to subscribers online via another web service or software, such as a web browser. Software and data associated with the cloud computing network are stored on servers and their associated memory (not shown).

In another embodiment (e.g., when the independent incremental workflow 16 is used), the system 10 may be set up as a network for use with a proprietary system where a bank of computers (e.g., processors and/or servers) i) has no backward visibility in the workflow and ii) enables computing based upon that which is received from a previous node in the workflow. Each computer has its own software and data stored on servers and their associated memory (not shown).

Figure 2:
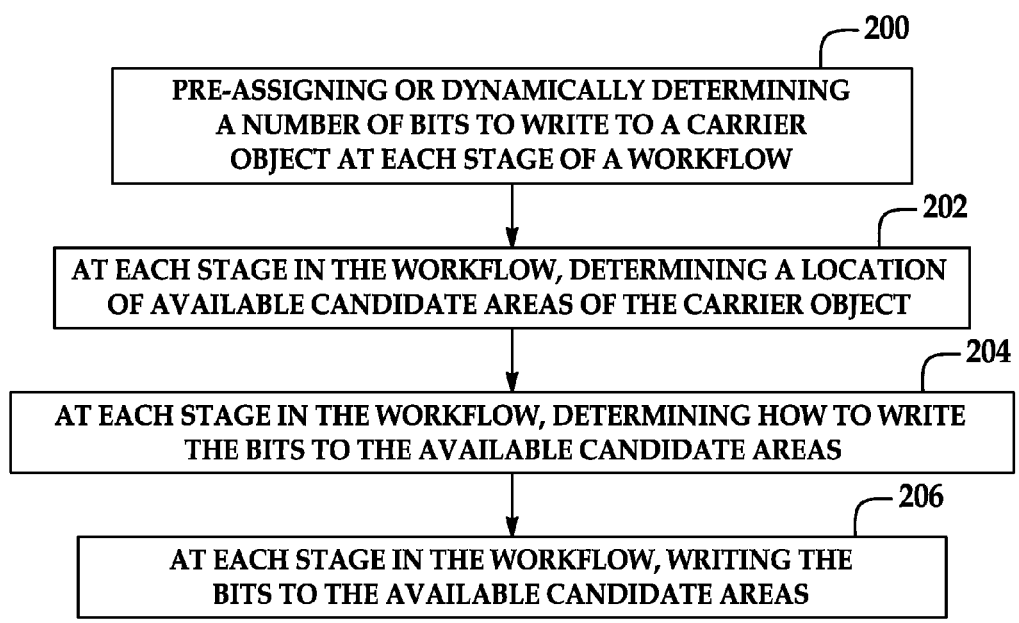
FIG. 2 is a flow diagram of an embodiment of a method for generating an embodiment of the incrementally completed security mark.

One embodiment of the method for generating the identifying object using the system 10 is shown in FIG. 2. It is to be understood that the various steps of the method are further discussed hereinbelow.

Prior to configuring the system 10 and its various components to generate an identifying object, the stages of the workflow can be set and a number of payload elements to write in total or during each state of the workflow can also be set. In some instances however, the number of payload elements may be dynamically determined at any stage in the workflow (e.g., if additional bits need to be added for security at a stage of the workflow that takes place outside of a secure environment). In one embodiment, a carrier object may be selected first, and then the workflow and number of payload elements may be designed around the selected carrier object, in another embodiment, the workflow and the number of payload elements may be selected, and then the carrier object may be selected to fit the specifications of both the workflow and the total number of payload elements (i.e., the carrier object contains all needed modules for every step in the workflow upon creation of the identifying object). A carrier object is the feature or mark that will be incrementally written to throughout the workflow to form the identifying object (e.g., security mark). The carrier object includes a field of modules/glyphs/area (e.g., marks, dots, graphics, symbols, etc.) that has two or more possible states, where each state is readily disambiguated from each other state. Examples of suitable carrier objects include 2D security marks (such as barcodes including modules that can be one of two states, e.g., a set of black (or other designated color) and white (or other designated color) tiles) and 3D security marks (such as barcodes including modules that can be one of two or more states, e.g., a set of color tiles, layered tiles, color lines, guilloches, etc.). Each state of the carrier object is determined by the set of glyphs that have been written to at a given stage of the workflow. It is to be understood that at least some of the individual glyphs of the carrier object may also have two or more states (i.e., white and black (e.g., 2 states), or 4 different colors (e.g., 4 states)).

In one embodiment, the carrier object, the workflow, and the number of payload elements are set at the identifying object registry 12. The identifying object registry 12 includes a computer-readable medium with a computer program including computer readable code for selecting the carrier object, selecting a number of steps/stages in the workflow, selecting a security level for each step/stage in the workflow, and pre-selecting (i.e., before the workflow is initiated) or dynamically determining (i.e., as the workflow is in progress) a number of payload elements (e.g., bits) to be input at each step/stage in the workflow (see reference numeral 200 of FIG. 2). The workflow and preset number of payload elements may be set or defined using information received at the registry 12 from one or more participants in the workflow. For example, a product manufacturer may request that a workflow be set up for a particular product, and may provide the following information: the distributor, the retailer, and product identification information (e.g., serial number). The identifying object registry 12 may then select a suitable carrier object, generate a suitable workflow, and preset payload information based upon this information. The carrier object and the preset number of payload elements may also be set by the workflow, and thus can be accessed (or looked up) using a number of methods.

In the example provided above, the workflow may involve three stages, the manufacturer, the distributor, and the retailer. At each stage, the workflow may require an individual (e.g., at the manufacturer or distributor) to sign a document associated with the product prior to shipping the product and document to the next entity, and may require an individual at the retailer to sign the document upon receiving the product and document.

The number of payload elements to write to the carrier object at each stage of the workflow is proportional to the desired minimum level of (statistically based) security at any given stage. High-level security stages may write more bits of information to the carrier object, while low-level security stages may write less bits of information to the carrier object. Both probability (i.e., what level of confidence is needed so that the next state of the carrier object cannot be guessed with p probability) and/or Hamming distance (i.e., the sum of bits, defined in the glyphs/areas of the carrier object, that are different from one stage to the next) may be used to identify the number of bits to encode at each stage of the given workflow.

In one embodiment, determining the probability involves determining the number of ways of writing to each stage in the workflow. For writing M bits to the carrier object at a particular stage with N glyphs still open for writing, there are $N!/M!(N-M)!$ ways of writing to the next stage. Suppose there are a total of 32 bits to write to a carrier object and it is desirable to include 4 bits at one stage in the workflow. The carrier object selected should include at least 32 available glyphs for writing, and thus when encoding the 4 bits, the first bit could be written in 32 places, the second bit could be written in 31 places, the third bit could be written in 30 places, and the fourth bit could be written in 29 places. There are 24 different ways (orderings) to write these 4 bits, and as such, there are $(32*31*30*29)/(4*3*2*1)=35,960$ unique ways to write the four bits in a carrier object having 32 available glyphs for writing. In this example, the 35,960 unique ways to reach the next state represent more than $2^{15}$ different possibilities, and so effectively represent just over 15 bits of security. Additionally, this example represents a situation in which there is merely a one in a 35,960 chance of someone guessing the right way to write these glyphs. The probabilities for each stage may be predicted in a similar manner.

When the total number of bits is known and the probability is known (set based upon a desired security level) or calculated (as illustrated above), this information may be used to determine the number of bits to write to each stage of the given workflow. As one example, suppose that there are a total of 100 bits to write to a carrier object throughout the workflow and the security requirement at each stage is such that there is less than a one in a $10^{12}$ probability of guessing the correct states of the carrier object, then $100!/M!(100-M)! \geq 10^{12}$, or $M \geq 9$. In this example, 9 or more bits may be written to at each workflow stage. For example, if the workflow has three steps, 33 bits may be written at the first two stages, and 34 may be written at the last stage.

In one embodiment, the Hamming distance between successive stages is fixed. As mentioned above, the Hamming distance is the sum of bits that are different from one state to the next, and is fixed for one or more embodiments of the identifying object disclosed herein.

As such, when the number of stages in the workflow has been set and the probability of guessing the state-state transitions required for each stage has been calculated or is otherwise known, the size of the carrier object can be determined and the number of bits to write incrementally can also be determined.

In embodiments when the carrier object is selected after the total number of bits is identified, the identifying object registry 12 may consider, when selecting the carrier object, the total number of bits to be written to the carrier object, whether it is desirable to include entropy in the identifying object, whether it is desirable to include non-payload indicia in the identifying object, and whether it is desirable to utilize multi-modalities to encode information.

The probability of guessing the initial state with less than a particular (pre-defined) statistical probability may be added prior to the initiation of the workflow by partially filling available modules of the carrier object. It is to be understood that a partially completed state of the carrier object has greater security (statistically) than an all-white state (or blank state) of the carrier object. In the case of a binary barcode, the entropy is $$-\sum_{i \in (0,1)} p(i) * \ln(p(i)),$$

where p(0) is the percentage of white elements and p(1) is the sum of black elements. When all the modules are white or else all are black, the entropy is 0.0. When half are white and half are black, the entropy increases to its maximum of 0.693. In one example, if 16 of 64 payload bits are used to set entropy at the initiation of the workflow, 16 of the 64 payload bits should also be retained as white, unwritten to glyphs/areas at the end of the workflow to retain the entropy. Here, entropy is $-[0.25*\ln(0.25)+0.75*\ln(0.75)]=0.562$ (a substantial portion of the maximum possible value of 0.693). In this example, the carrier object should include at least 64 glyphs/areas so that 32 glyphs/areas can be used for entropy and 32 glyphs/areas can be used to write the remainder of the 64 payload bits throughout the workflow (e.g., in a three stage workflow, 11 bits, 11 bits and 10 bits can be written to the carrier object, respectively). In another embodiment, entropy requires an image (glyph/area mage) histogram in some space, like hue, intensity or saturation. For example, a magenta glyph can be made magenta +/- some variance in hue instead of just magenta. These two hues will have different hue entropies, defined as:

$$-\sum_{i \in hues} p(i) * \ln(p(i))$$

where p(i) is the percentage of histogram elements in bin i out of all histogram pixels.

The introduction of non-payload indicia also affects the size of the carrier object because non-payload indicia is included in glyphs/areas of the carrier object that may have otherwise been written to with payload elements/information. Non-payload indicia do not contain payload elements/information, but rather are used for calibration (e.g., color, skew, and orientation calibration) of the carrier object, for example, at each stage in the workflow. Non-payload indicia may also be used for branding, symbology identification, or the like. When it is desirable to include non-payload indicia, the number of glyphs/areas to be used for the non-payload indicia may be accounted for in the total number of glyphs/areas that are desirable for the carrier object.

When selecting the carrier object, it may also be desirable to identify whether multi-modalities will be used to encode information. In these instances, additional information is physically overlaid on glyphs/areas before or after the glyphs/areas have progressed to the full black (or other final color) state. The addition of such information may be accomplished using, for example, magnetic ink character recognition (MICR) ink, ultraviolet (UV) ink, infrared (IR) ink, conductive ink, capacitive ink, other taggants that can be read with a specialized reader (e.g., DNA), or finishes that can be read over the final black or other colored ink (e.g., lacquers that can be read by impedance, reflectance, etc.). If the use of multi-modalities is known when selecting the carrier object, the selection can account for the fact a single glyph/area in the carrier object may contain more information than the standard carrier object. The use of multi-modalities may be desirable, for example, when specialized readers are to be used for decoding (e.g., MICR readers, RFID readers, etc.), when there is paucity of real estate for the identifying object, when security check-offs are desirable (e.g., use of UV ink requires a counterfeiter to purchase the product bearing the identifying object which creates a trail), when enhanced forensic capacity is desired (e.g., using IR inks), and/or when additional functionality is desired (e.g., conductive or capacitive information encoding).

When a multi-modality approach is used, each of the additional layers has the following characteristics: (1) glyph x-dimension, dim, (2) glyph y-dimension, dim, and (3) glyph intensity levels and associated number of bit levels, $n_b$. The number of additional bits/glyph is $\ln(n_b)/\ln(2)$.

As an example of using multi-modalities, an MICR ink layer is superimposed on a 2D or 3D barcode (e.g., which has dimensions nglyphs$_x$ by nglyphs$_y$, where the glyphs are sized size$_x$ by size$_y$). When the MICR ink (e.g., VersaInk black MICR ink manufactured by G7 Productivity Systems) is black, it may be used over black pixels, and thus is added after all of the color transformations have been made. Since in any given glyph there is either MICR or not, there are $\ln(2)/\ln(2)=1$ bits/glyph. If the MICR bits are dim, by dim in size, then the number of MICR glyphs in the x-direction is (floor)((nglyphs$_x$*size$_x$)/dim$_x$), where floor is the integer value (not rounded, as partial glyphs are not used) of the floating point value (nglyphs$_x$*size$_x$)/dim$_x$. The number of modules in the y-direction is (floor)((nglyphs$_y$*size$_y$)/dim$_y$). Thus, the overall number of bits added by the MICR, $N_b$(MICR), is:

$N_b$(MICR)=(floor)((nglyphs$_x$*size$_x$)/dim$_x$)*(floor) ((nglyphs$_y$*size$_y$)/dim$_y$)

In general, if more than one modality (MICR, UV, conductive, etc.) of layers are added to the barcode, the total number of bits are given by:

$$N_b(\text{total}) = \sum_{x \in \text{modalities}} (\text{floor})((nglyphs_x * size_x) / dim_x) *$$

$$(\text{floor})((nglyphs_y * size_y) / dim_y) * \frac{\ln(n_b(x))}{\ln(2)}$$

Once the workflow is generated (including the various stages and the number of bits to be encoded) and the carrier object is selected, the workflow is initiated. The workflow instructions (e.g., the procedural rules for the transmission of the document(s), actions or purposes associated with the document(s), and either the total number of bits to encode or the number of bits to encode in the document's carrier object at each stage in the workflow) is transmitted electronically to at least the first computer/workstation (e.g., the computers/workstations located at the manufacturer) to be used at the first stage in the workflow. In one embodiment, the computers/workstations used during subsequent stages in the workflow may receive the instructions from the first computer/workstation or from a computer/workstation used in the previous workflow stage. In another embodiment, the computers/workstations used during subsequent stages in the workflow may retrieve the instructions from the registry 12 via the cloud computing network. In another embodiment, the workflow may be initiated without transmitting the workflow instructions. For example, the document and its associated carrier object may be transmitted to the first entity in the workflow. It is to be understood that as long as the starting point of the work known, one can deduce each stage of the workflow.

Throughout the following discussion, reference is made to FIG. 2 and FIGS. 3A through 3E. FIGS. 3A through 3D illustrate a 2D carrier object 20 including modules (e.g., glyphs/areas), which in this example are tiles $T_1$, $T_2$, $T_3$, $T_4$, $T_5$ (all of which are not labeled with the reference character "T") that can have information incrementally written thereto throughout the workflow. At the end of the workflow, the identifying object 20''' is generated. FIG. 3A illustrates glyphs/areas (i.e., the tiles along the perimeter of carrier 20) that have been filled in with non-payload indicia NPI. In this example, the non-payload indicia NPI have been implemented as solid tiles (along the left and bottom sides of the carrier 20) and as alternating white/black tiles (along the top and right sides of the carrier 20), which provide calibration during subsequent processing. In FIG. 3A, the remaining white tiles (i.e., including tiles $T_1$, $T_2$, $T_3$, $T_4$, $T_5$ and not including non-payload indicia tiles NPI) are available candidate areas, which can have information written thereto throughout the workflow.

FIG. 3B illustrates 16 of the available candidate areas being pre-filled with 1 bit of data each in order to add entropy to the carrier object 20.

The carrier object 20, and the document it is associated with, may be physically transmitted or electronically transmitted, and then received at the entity that is associated with the first stage in the workflow. When physically transmitted and received, the document and carrier object 20 have been printed and shipped to the entity. When electronically transmitted and received, the document and carrier object 20 have been electronically sent (via email or some other electronic based messaging service) to a computer/workstation at the entity. Regardless of how the document and its associated carrier object 20 are transmitted and received at the entity, a user at the entity obtains an electronic form of the document and its associated carrier object 20. When electronically received, the user need not perform any additional task in order to obtain the electronic form, and when physically received, the user scans or captures with an imager (e.g., a camera) the current image of at least the carrier object 20 to obtain the electronic form.

When the action, task, etc, set forth in the workflow stage I instructions have been performed (e.g., a task is performed and a digital signature verifying task completion is obtained), the carrier object 20 is incrementally written to according to the workflow stage I instructions. This is shown in FIG. 3C.

When incrementally writing to the carrier object 20, the electronic form of the carrier object 20 is first segmented. Segmentation involves extracting the carrier object 20 from the overall electronic image and determining the content of the carrier object 20. In one embodiment, this is a two-stage process. First, the carrier object 20 is identified in the image and segmented from the entire image. Second, the carrier object 20 itself is interpreted (i.e., decoded).

Segmentation may also involve calibrating the carrier object 20. Calibration may involve orienting the carrier object 20 using the non-payload indicia 20, dewarping the carrier object 20, deskewing the carrier object 20, identifying a set of allowable hues, or the like. It is to be understood that calibration may be performed in conjunction with interpretation of the carrier object 20, or calibration may be performed and then interpretation of the carrier object 20 may be performed.

The carrier object 20 is interpreted/decoded by analyzing the pixels in each of the glyphs of the object 20. When more than 50% of the pixels in a glyph are black, the glyph will be identified as a black or written to glyph. When more than 50% of the pixels in a glyph are white, the glyph will be identified as a white or non-written to (available) glyph. The interpretation/decoding of the carrier object 20 in FIG. 3B (as received by those performing workflow stage I) will reveal that there are non-payload indicia along the perimeter and that 16 of the 64 available candidate areas have been written to. As shown at reference numeral 202 of FIG. 2, the computer/workstation performing the incremental writing at workflow stage I then determines the location of remaining available candidate areas that can be written to (e.g., modules not already filled with non-payload indicia, entropy information, etc.). It is to be understood that a variety of algorithms may be used to determine where to place the information associated with workflow stage I (which includes the preset number of bits). Examples of these algorithms include scrambling, random/nonce, one-time-pad, encryption, data replication, etc. These techniques identify where the information can be added to the carrier object 20.

In one embodiment after the available candidate areas in the carrier object 20 are identified, the computer/workstation performing the incremental writing at workflow stage I then identifies or retrieves the preset number of bits (e.g., from the workflow instructions) to be written at the then-current stage. In other embodiments, the number of bits to be written at a particular stage may be determined automatically by the computer/workstation performing the incremental writing at workflow stage I and/or by a user at workflow stage I. In the latter embodiments, the total number of bits to be encoded throughout the workflow is known, and the computers/workstations at each workflow stage would add a suitable amount of information to the carrier object 20. For example, a string containing 0's and then 1's incrementally to be written could be stored as a nonce and then the is would be incrementally written to the carrier object 20 stage by stage.

The computer/workstation performing the incremental writing at workflow stage I then determines how to write the information (i.e., the preset or dynamically determined number of bits), as shown at reference numeral 204 of FIG. 2. An algorithm for incorporating the information for the current workflow stage is deployed. This algorithm may be a scrambling algorithm, a random algorithm, encryption of the user's public key plus nonce, etc. In instances where the registry-based workflow 14 is used, the previous state of the carrier object 20 may be replicated using the cloud network, so that random/nonce methods are valid when inputting new information. For example, the information to be added is provided by a random number generator and is stored in the registry 12. In this example, a string containing 0's and then 1's incrementally to be written could be stored as a nonce and then the 1's would be incrementally written to the carrier object 20 stage by stage. In instances where the independent incremental workflow 16 is used, each workflow stage involves an intelligent hash of the previous state of the carrier object 20. In this example, a deterministic approach may be used, in which the newly written information is determined from the current state of the carrier object 20 and any additional pre-populated information that distinguishes the carrier object 20 from other carrier objects (e.g., SKU specific information and mass serialization information). For example, if a document has other unique information, e.g., number for routing or another barcode/stock identifier for point of sale, the other unique information can be included in the digital signature (i.e., the output of an operation on a binary string using a private key) to create the next set of bits to write.

The computer/workstation performing the incremental writing at workflow stage I then writes the information to the carrier object 20 to form the carrier object 20', as shown at reference numeral 206 of FIG. 2 and as illustrated in FIG. 3C. In this example, unwritten to (or available) candidate areas are written to. In other examples, available candidate areas may include those modules or other glyphs that had previously been written to, but will be overwritten or layered using multi-modalities or color. During each writing stage in the workflow, it is to be understood that any previously written information will not be removed or changed.

While the number of bits to be written is preset in one embodiment, the actual writing of the information takes place dynamically as the workflow progresses. As such, the candidate areas that are actually written to are determined in real time according to, in part, the areas available for writing, the number of bits to be written, and the algorithms used.

The document and its incrementally written to carrier object 20' can be printed and/or stored. When the carrier object 20, 20' is completely physical, the document with the carrier object 20 printed thereon as it was received (from the previous stage or from the registry 12) can be overprinted so that the newly written to areas will be filled in the printed version. When the carrier object 20, 20' is physical and electronic, the electronic version of the document and the incrementally written to carrier object 20' can be reprinted, if desired. When the incrementally written to carrier object 20' is saved, it is to be understood that it will replace any prior versions of the carrier object 20.

The document and incrementally written to carrier object 20' are then shipped (electronically or physically) to the next entity in the workflow. When the action, task, etc. set forth in the workflow stage II instructions have been performed, the carrier object 20' is incrementally written to according to the workflow stage II instructions. This is shown in FIG. 3D. Incrementally writing information to the carrier object 20' to form carrier object 20" includes the steps of segmenting the electronic version of the carrier object 20', determining the location of remaining available candidate areas that can be written to (e.g., tiles not already filled with non-payload indicia, entropy information, previously written information etc.), identifying or retrieving the preset number of bits (e.g., from the workflow instructions) to be written at the then-current stage, determining how to write the information, and then writing the information to the carrier object 20. In this example, unwritten to (or available) candidate areas are written to. In other examples, available candidate areas may include those modules or other glyphs that had previously been written to, but will be overwritten or layered using multi modalities or color. The document and its incrementally written to carrier object 20" can be printed and/or stored. It is to be understood that the steps involved in incrementally writing at this stage are performed via the computer/workstation at workflow stage II.

In the embodiment shown in FIGS. 3A through 3E, the document and incrementally written to carrier object 20" are then shipped (electronically or physically) to the next entity in the workflow. When the action, task, etc. set forth in the workflow stage III instructions have been performed, the carrier object 20" is incrementally written to according to the workflow stage III instructions. This is shown in FIG. 3E. Incrementally writing information to the carrier object 20" to form carrier object 20"' may be accomplished in a manner similar to that described for writing to earlier versions of the carrier object 20, 20'. Briefly, incremental writing at this stage in the workflow includes the steps of segmenting the electronic version of the carrier object 20", determining the location of remaining available candidate areas that can be written to (e.g., tiles not already filled with non-payload indicia, entropy information, previously written information etc.), identifying or retrieving the preset number of bits (e.g., from the workflow instructions) to be written at the then-current stage, determining how to write the information, and then writing the information to the carrier object 20". In this example, unwritten to (or available) candidate areas are written to. In other examples, available candidate areas may include those modules or other glyphs that had previously been written to, but will be overwritten or layered using multi-modalities or color. The document and its incrementally written to carrier object 20''' can be printed and/or stored. It is to be understood that the steps involved in incrementally writing at this stage are performed via the computer/workstation at workflow stage III.

Since the workflow in the example in FIGS. 3A through 3E include three workflow stages, the carrier object 20''' shown in FIG. 3E is the identifying object 20W or security mark that is a secure verification that the workflow has proceeded correctly. In this particular example, since 16 bits of entropy were included at the outset of the workflow (see FIG. 3B), 16 white tiles remain unwritten to in the final object 20''' in order to preserve the level of (statistical) security offered by making the final state as difficult to guess as the initial state. As illustrated in FIGS. 3A through 3E, the final identifying object 20''' has less available candidate areas than the original carrier object 20 due to the incremental writing throughout the workflow, but has the same shape and size as the original carrier object 20.

It is to be understood that the previous states of the carrier object 20, 20', 20" are still provable because there are no new available candidate areas in the later stage(s) of the carrier object 20, 20', 20", 20'''. In embodiments where the computers/workstations at each stage in the workflow have access to all the rules governing writing at the previous stages, these computers/workstations can automatically check all previous states of the carrier object for validity when checking the then-current state.

Referring now to FIGS. 4A through 4D, another embodiment of the carrier object 20 is depicted, however, these figures illustrate different examples of incremental writing that can take place at one stage of a workflow. FIGS. 4C and 4D in particular illustrate the dynamic writing that can take place using the embodiments disclosed herein.

FIGS. 4A and 4B are similar to FIGS. 3A and 3B, and illustrate a 2D carrier object 20 including modules, which in this example are tiles $T_1$, $T_2$, $T_3$, $T_4$, $T_5$ (all of which are not labeled with the reference character "T"), that can have information incrementally written thereto throughout the workflow. This workflow includes one stage. FIG. 4A illustrates glyphs/areas (i.e., the tiles along the perimeter of carrier 20) that have been filled in will non-payload indicia NPI, and FIG. 4B illustrates 16 of the available candidate areas (e.g., glyphs/tiles available for being written to) being pre-filled with 1 bit of data each in order to add entropy to the carrier object 20. In one embodiment, if multiple identifying objects (e.g., 20' in FIGS. 4C and 4D) are part of the same shipment, it may be desirable to have the same pre-filled set of data bits. However, it multiple identifying objects are not part of the same shipment, it is noted that there are more than $4.88 \times 10^{14}$ ways of selecting 16 of the 64 pre-filled data bits.

At the one stage in this workflow, the carrier object 20 is to be infilled with 11 bits of data. There are more than $2.25 \times 10$ ways of selecting these 11 bits from the remaining 48 open tiles. The incremental nature of the writing affords much higher number of combinations for writing from one state to the next than the number of bits would simply indicate. FIGS. 4C and 4D illustrate that a number of unique identifying objects 20''' (or carrier objects 20', 20'') can be readily computed at each stage in the workflow. Since there are numerous ways of writing information at the various stages, other carrier objects 20, 20', 20'', 20''' will have available candidate areas at different locations, which aids in preventing casual counterfeiting since the odds of having two carrier objects 20, 20', 20'', 20''' with the same available candidate areas at any stage of the workflow is very small.

Embodiments of the identifying objects (or security marks) 20''' disclosed herein retain the set real estate on a document even through information is incrementally written thereto throughout a workflow. The state of the identifying object 20''' and the then-current stage of the workflow may be gleaned directly from the percentage of the elements that are filled in or saturated, without knowing how to interpret the data embedded therein.

While several embodiments have been described in detail, it will be apparent to those skilled in the art that the disclosed embodiments may be modified. Therefore, the foregoing description is to be considered non-limiting rather than limiting.

What is claimed is:

1. A system for generating an incrementally completed security mark, comprising a computer-readable medium encoded with a computer program having:
   computer readable code for selecting a carrier object;
   computer readable code for selecting a number of steps in a multi-step workflow associated with the carrier object and a security level for each step in the multi-step workflow;
   computer readable code for determining available carrier object candidate areas to which to write information at each step in the multi-step workflow;
   computer readable code for determining a number of bits to be input at each step in the multi-step workflow based upon the respective security levels and the available candidate areas; and
   wherein the system further includes memory and a processor operatively coupled to the memory and to the computer-readable medium, and wherein the multi-step workflow is an automated process during which the carrier object is passed from one participant of the multi-step workflow to another participant of the multi-step workflow.

2. The system as defined in claim 1, further comprising:
   computer readable code for determining how to write information at each step in the multi-step workflow; and
   computer readable code for writing the information to at least some of the available candidate areas at each step in the multi-step workflow.

3. The system as defined in claim 2, further comprising a printer for printing the carrier object at each step in the multi-step workflow.

4. The system as defined in claim 2, further comprising a printer for printing the security mark.

5. The system as defined in claim 1, further comprising computer readable code for setting non-payload indicia (NPI) in the carrier object.

6. A system for generating an incrementally completed security mark, comprising a computer-readable medium encoded with a computer program having:
   computer readable code for selecting a carrier object;
   computer readable code for selecting a number of steps in a workflow associated with the carrier object and a security level for each step in the workflow;
   computer readable code for determining available carrier object candidate areas to which to write information at each step in the workflow;
   computer readable code for determining a number of bits to be input at each step in the workflow based upon the respective security levels and the available candidate areas, wherein the computer readable code for determining the number of bits to be input at each step in the workflow includes a binary string nonce to determine the number of bits dynamically at each step in the workflow; and
   wherein the system further includes memory and a processor operatively coupled to the memory and to the computer-readable medium.

7. The system as defined in claim 1, further comprising an instrument for overlaying additional information into a previously written-to candidate area with a different modality than that used for writing to the candidate area.

8. A security mark comprising:
   an incremental identifying object having a size and shape that are unchanged as information is written to the object; and
   available candidate areas in the identifying object for receiving information, at least some of the available candidate areas having had the information written thereto during a lifecycle that includes a multi-stage workflow during which the incremental identifying object is passed from one participant to another participant such that the incremental identifying object is different at each stage of the multi-stage workflow, thereby forming the security mark having a smaller percentage of available candidate areas than is included in the identifying object prior to the lifecycle.

9. The security mark as defined in claim 8 wherein the security mark is chosen from an electronic security mark, a mixed electronic and physical security mark, and a physical security mark.

10. The security mark as defined in claim 8 wherein the security mark is chosen from a 2D barcode and a 3D barcode.

11. The security mark as defined in claim 8, further comprising information written to some available candidate areas in the identifying object prior to initiation of the multi-stage workflow.

12. A method for generating a security mark, comprising:
    initiating a multi-stage workflow including multiple stages, wherein the multi-stage workflow is an automated process during which a carrier object is passed from one participant to another participant;
    pre-assigning or dynamically determining a number of bits to write to the carrier object at each stage of the multi-stage workflow;
    at each stage in the multi-stage workflow, determining a location of available candidate areas of the carrier object;
    at each stage in the multi-stage workflow, determining how to write the bits to the available candidate areas; and
    at each stage in the multi-stage workflow, writing the bits to the available candidate areas.

13. The method as defined in claim 12, further comprising overlaying some of the bits on a previously written-to candidate with a different modality than that used for writing to the previously written-to candidate area.

14. The method as defined in claim 12, further comprising:
    setting non-payload indicia (NPI) in the carrier object; and
    starting the multi-stage workflow in a partially filled state that is different from a blank state of the carrier object.

15. The method as defined in claim 12 wherein writing the bits to the available candidate areas is accomplished by one of:
    electronically writing to respective available candidate areas at each stage in the multi-stage workflow; or
    printing on respective available candidate areas at each stage in the multi-stage workflow.

* * * * *